United States Patent [19]

Bargain et al.

[11] 3,948,864

[45] Apr. 6, 1976

[54] PARTIALLY CROSSLINKED SILALACTONE POLYMERS, THEIR PREPARATION AND THEIR USE

[75] Inventors: Michel Bargain; Zéno Pasquini, both of Lyon, France

[73] Assignee: Rhone-Poulenc S.A., Paris, France

[22] Filed: June 12, 1974

[21] Appl. No.: 478,604

[30] Foreign Application Priority Data

June 13, 1973 France.............................. 73.21494

[52] U.S. Cl. ........ 260/78.3 R; 260/448.2 B; 427/44; 427/387; 428/446; 428/452
[51] Int. Cl.² ................... C08G 63/68; C08G 63/02
[58] Field of Search ................ 260/78.3 R, 448.2 B; 204/159.13

[56] References Cited

UNITED STATES PATENTS

| | | | |
|---|---|---|---|
| 3,169,945 | 2/1965 | Hostettler et al. .................. | 260/78.3 |
| 3,523,920 | 8/1970 | Schultz ................................. | 260/37 |
| 3,523,921 | 8/1970 | Schultz ................................. | 260/37 |
| 3,778,458 | 12/1973 | Morehouse................... | 260/448.2 B |

OTHER PUBLICATIONS

Mironov et al., "Synthesis of Lactones and Lactams with Silicon Atom in the Ring," *Chem. Abstracts* 66, 760077p (1967).

*Primary Examiner*—Donald E. Czaja
*Assistant Examiner*—Earl A. Nielsen
*Attorney, Agent, or Firm*—Stevens, Davis, Miller & Mosher

[57] ABSTRACT

Linear homopolymers of 3,5,5-trimethyl-1-oxa-5-silacyclohexan-2-one are crosslinked through the 5-methyl group, e.g. by heating with an organic peroxide, to give polymers. Films of these cross linked polymers have a critical surface tension similar to teflon and can be used for water proofing. The films also exhibit selective permeability to gases and can be used to reduce the $CO_2$ content of $CO_2/O_2$ mixtures.

9 Claims, No Drawings

PARTIALLY CROSSLINKED SILALACTONE POLYMERS, THEIR PREPARATION AND THEIR USE

The present invention relates to silalactone polymers which are produced by cross linking linear silalactone polymers.

Lactone polymers are already known in which the monomer contains 4–12 chain members. These lactones, the processes for their polymerisation and their polymers have been described, for example, by K. C. Frisch and S. L. Reegen; Kinetics and mechanisms of polymerisation, Vol. II: Ring Opening polymerisation (1969).

Lactone polymers have now been prepared in which the monomer possesses a silicon atom carrying methyl groups, this silicon atom being bonded to two carbon atoms of the ring.

The present invention provides a 3,5,5-trimethyl-1-oxa-5-sila-cyclohexan-2-one polymer having repeat units of formula I

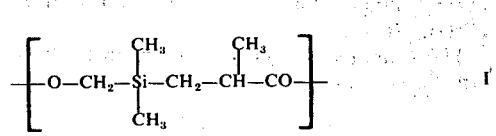

at least some of the units being cross-linked to one another.

In these cross linked polymers, it is preferred that the carboxylic chain end is blocked with a blocking group for carboxylic groups and the hydroxy chain end is blocked with a blocking group for hydroxy groups.

The process for the preparation of these partially crosslinked polymers consists of crosslinking a linear 3,5,5-trimethyl-1-oxa-5-sila-cyclohexan-2-one homopolymer by any known means, the chain ends of the homopolymer being preferably blocked as described above.

The linear homopolymer is produced by polycondensation of 3,5,5-trimethyl-1-oxa-5-sila-cyclohexan-2-one

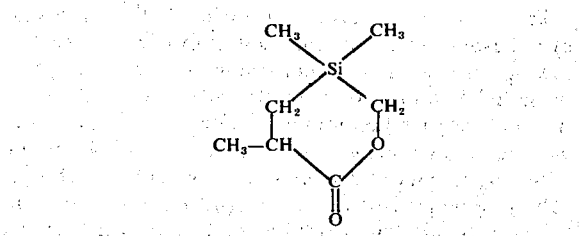

3,5,5-Trimethyl-1-oxa-5-sila-cyclohexan-2-one (denoted hereafter, for convenience, by the term silalactone) can be prepared from trimethylsilyl methacrylate and chloromethyldimethylhydrogenosilane in accordance with the method described by V. F. Mironov and N. S. Fedotov [Khim Geterotsikl. Soedin Akad. Nauk Latv SSR, 1966 (3) 453-6; *Chemical Abstracts*, 66, 76077p (1967)].

Polycondensation of the silalactone can be effected by means of anionic, cationic or neutral initiators, in accordance with the methods described by K. C. Frisch and S. L. Reegen (reference mentioned above). Anionic or cationic initiators are very particularly preferred since they make it possible to carry out the polycondensation reaction at a moderate temperature and thus to obtain high molecular weights. The process can be carried out in bulk or in solution.

Anionic initiators which can be used, include alkali metals, alkali metal salts of organic acids, simple or mixed hydrides such as sodium hydride, lithium hydride and lithium aluminium hydride, trialkylaluminium compounds, alkali metal amides, alkali metal alcoholates and the like.

Cationic initiators, which may be used include aluminium chloride, boron trifluoride, ferric chloride, stannic tetrachloride and strong acids such as sulphuric acid, p-toluenesulphonic acid, trifluoroacetic acid and the like.

The amount of initiator introduced is usually such that the molar ratio of the monomer to the initiator is less than 5,000:1 and preferably less than 1,500:1. If it is desired to produce polymers of as high molecular weight as possible, it is necessary to use the lowest possible amounts of initiators but these amounts must nevertheless be sufficient to maintain a rate of polycondensation which is not too low.

The process for the condensation of the silalactone is usually carried out at a temperature of between 0° and 150°C, and generally below 100°C. It is possible to use organic solvents, for example aliphatic, cycloaliphatic or aromatic hydrocarbons such as hexane, cyclohexane, toluene and the like.

The linear silalactone homopolymers have viscosity indices which are usually between 0.55 and 1.5. These homopolymers, which appear to be terminated by an acid group and by an alcohol group, can optionally be treated in order to block the reactive chain ends. Any suitable reagent which is known to block carboxylic acid and/or hydroxyl groups can be used. For this purpose, acetyl chloride, phenyl isocyanate, acetic anhydride, diazomethane and the like may be used.

The linear silalactone homopolymers which may be blocked at the chain endings also form a part of the present invention. These homopolymers are generally hard gums which are elastic and sticky to the touch. On crosslinking, they are changed into compounds which can readily yield films which can be detached from their supports. Depending on their degree of crosslinking, these compounds can have a diverse range of properties and use, as will be explained later.

The crosslinking of the linear silalactone polymers can be effected, as mentioned above, by any of the various crosslinking techniques which are known in the art to be capable of crosslinking polysiloxanes carrying methyl groups attached to the silicon atom. For example, the crosslinking can be effected by heating the linear polymer with peroxides.

The amounts of peroxide employed can vary depending on the nature of the properties which it is desired to impart to the polymer. The degree of crosslinking can be controlled in such a way that the resulting films are flexible and elastic. It is also possible to produce compounds possessing valuable properties of insolubility and infusibility. However, too high a degree of crosslinking must not be introduced otherwise the resulting products become hard and brittle. In practice, the suitable amount of peroxide for each application will be determined easily by those skilled in the art, if necessary by means of preliminary experiments. It can be indicated, by way of example, that when the crosslinking is carried out above 100°C by means of benzoyl peroxide, the amount of peroxide used is such that 1–20 and preferably 2–10 mols of peroxide are used per 100 silalactone monomer units in order to produce a flexible film which is elastic and non-sticky.

The amount of peroxide employed can also vary with the nature of the peroxide. However, as a general rule, these proportions are substantially of the same order. The use of a peroxide of different nature however necessitates changing the vulcanisation temperature, since it is known that the crosslinking must be carried out above the temperature at which the peroxide undergoes scission. Peroxides which can be used include benzoyl peroxide, t.butyl peroxide, dichlorobenzoyl peroxide, cumene peroxide, t.butyl benzoate, t.butyl peracetate and the like.

It is also possible to use an irradiation technique employing high energy radiations (cobalt bomb, use of accelerated electrons and the like). These techniques are described, for example in the work by W. Noll: Chemistry and technology of silicones, p. 229–33 (1968).

The polymers according to the invention essentially comprise units (I) combined with units (II) and (III):

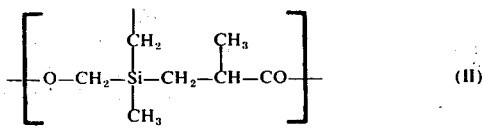

(II)

and

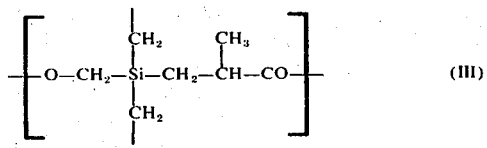

(III)

the units being formed together in the following way:
the 5-methylene group(s) of a unit (II) or unit (III) are bonded to a 5-methylene group of another unit (II) or (III),
(unit II groups being bonded to either unit II or unit III groups) and
each oxygen atom in a unit is bonded to a carbonyl group in another unit, which may be of the same or a different formula.

The crosslinking between the linear poly-(3,5,5-trimethyl-5-sila-δ-valerolactone) chains can also be effected in part by direct bridging of two silicon atoms or by bridging by means of an oxygen atom or a methylene group. The degree of crosslinking introduced by means of these groups however never corresponds to a large proportion of the total crosslinking.

In accordance with a further aspect of the invention, there is provided a substrate coated with a crosslinked linear silalactone polymer. The crosslinking of the linear silalactone polymer can be carried out directly on a substrate comprising films or articles made of linear polymer or a supported polymer. Composite materials for diverse uses are thus obtained. Semi-flexible paper or hard paper is a valuable substrate for this purpose. Treating the substrate be depositing a layer of linear silalactone polymer and then crosslinking this layer, imparts valuable surface properties to the substrate. In fact, it has been found that the critical surface tension of a polysilalactone film was similar to that of teflon. Now, it has been shown that it is the value of the critical surface tension which determined the properties of wettability of a support (*Bulletin de la Societe Chimique de France; Colloque adhesion et physicochimie de surfaces solides* [Colloquium on adhesion and physical chemistry of solid surfaces]; Mulhouse, 8th–10th October 1969, article by F. Vergara and B. Lespinasse, p. 3227–35). The deposition of a film of crosslinked silalactone polymer consequently imparts water-repellent properties to a substrate, these properties being similar to those imparted by a teflon coating.

The crosslinked polymers of the invention can also be used to prepare membranes which can be supported membranes and such membranes form a further aspect of the present invention. These membranes have valuable applications in gas permeation and pervaporation. A further aspect of this invention provides a method of separating at least one gas component from a gaseous mixture of at least two of oxygen, nitrogen and carbon dioxide which comprises bringing the gaseous mixture into contact with one side of the membrane and recovering from the other side of the membrane a gaseous mixture enriched in at least one gas component. These membranes are particularly valuable for reducing the carbon dioxide content of a gas mixture of oxygen and carbon dioxide.

The Examples which follow illustrate the invention. All temperatures are in °C.

EXAMPLE 1

7.26 G of benzoyl peroxide are added to an 18% solution in toluene of poly-(3,5,5-trimethyl-1-oxa-5-sila-cyclohexan-2-one), containing 158 g of polymer. Films of thickness 0.50 mm and of dimensions 15 × 25 cm are cast from this solution. The casting is carried out on glass plates coated with a thin film of teepol.

The crosslinking is effected by heating the films at 130° for 1 hour in a nitrogen atmosphere. The films, detached in water, are 0.09 mm thick. After the films have been reheated at 130° for 30 minutes, they possess the following properties:

Tensile breaking strength = .7 kg/cm²
Elongation at break = 400 %
Critical surface tension = 21 dynes/cm The linear poly-(3,5,5-trimethyl-1-oxa-5-sila-cyclohexan-2-one) polymer was produced in the following way: a mixture consisting of 7.9 g of 3,5,5-trimethyl-5-sila-δ-valerolactone and 0.076 ml of a solution of triisobutyl-aluminium (25% strength solution, volume/volume, in heptane) is kept at 70° for 45 hours, with stirring and under an argon atmosphere. The resulting polymer is dissolved in toluene and is precipitated by being poured into pentane. The precipitated polymer has a viscosity index of 0.99. Its weight average molecular weight, measured by light scattering, is 200,000.

EXAMPLE 2

Following the procedure of Example 1, polysilalactone films, which are crosslinked to various degrees by varying the amount of benzoyl peroxide, are prepared. The films are examined qualitatively.

| Mols of benzoyl peroxide per 100 monomer units | Appearance of the film after crosslinking |
|---|---|
| 2.5 | flexible - very elastic - slightly sticky |
| 3 | flexible - very elastic - non-sticky |

-continued

| Mols of benzoyl peroxide per 100 monomer units | Appearance of the film after crosslinking |
| --- | --- |
| 5 | flexible - elastic - non-sticky |
| 10 | brittle - only slightly elastic - non-sticky |

EXAMPLE 3

The permeabilities of films prepared according to Example 1 with respect to various gases are measured. These measurements are made in the following way:

After the membrane has been supported on a sintered metal plate, it is clamped in a measuring cell; the upstream side of this membrane is subjected to an excess pressure and the flow rate of gas downstream is measured by following the movement of a mercury index in a calibrated capillary. The membrane used has a surface area of 12.6 cm².

The permeability of the membrane to a given gas is the amount of gas (expressed in cm³ under normal conditions of temperature and pressure which has passed through the said membrane per cm² of surface area, per second, for a decrease in pressure of 1 cm of mercury between the upstream and downstream sides of the membrane). The measurements are related to a membrane of thickness 1 cm: the permeation constants are deduced therefrom.

The results obtained with the membrane are as follows:

Permeation constant/$O_2$ $2.8 \times 10^{-9}$ cm³ × cm/cm² × s × cm Hg

Permeation constant/$N_2$ $1 \times 10^{-9}$ cm³ × cm/cm² × s × cm Hg

Permeation constant/$CO_2$ $30 \times 10^{-9}$ cm³ × cm/cm² × s × cm Hg

The permeation selectivity of carbon dioxide relative to oxygen is 10.7.

We claim:

1. A 3,5,5-trimethyl-1-oxa-5-sila-cyclohexan-2-one polymer having repeat units of formula I

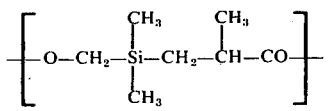

at least some of the units being crosslinked to one another.

2. A polymer according to claim 1 consisting essentially of repeat units of formula I, of formula II and of formula III

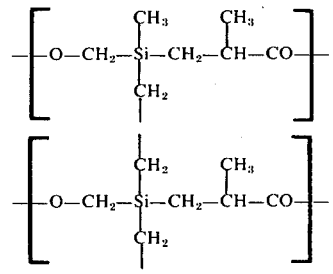

in which the 5-methylene —$CH_2$—group(s) in unit II and unit III is directly bonded to a 5-methylene —$CH_2$—group(s) in another unit II or unit III and each oxygen atom in a repeat unit is bonded to a CO group in another repeat unit.

3. A polymer according to claim 1 in which the carboxylic chain end is blocked with a blocking group for carboxylic groups and the hydroxy chain end is blocked with a blocking group for hydroxy groups.

4. A process for the preparation of a 3,5,5-trimethyl-1-oxa-5-sila-cyclohexan-2-one polymer as defined in claim 1 wherein a linear 3,5,5-trimethyl-1-oxa-5-sila-cyclohexan-2-one homopolymer is partially crosslinked.

5. A process according to claim 4 wherein the carboxylic chain end of the linear 3,5,5-trimethyl-1-oxa-5-sila-cyclohexan-2-one polymer is blocked with a blocking agent for carboxylic groups and the hydroxy chain end of the linear polymer is blocked with a blocking agent for hydroxy groups.

6. A process according to claim 4 wherein the crosslinking is effected by heating the polymer with a peroxide.

7. A process according to claim 6 wherein 1–20 mols of peroxide is used per 100 monomer units present in the linear 3,5,5-trimethyl-1-oxa-5-sila-cyclohexan-2-one polymer.

8. A process according to claim 4 wherein the crosslinking is effected by irradiating the linear polymer.

9. A membrane having selective permeability to gases comprising a crosslinked 3,5,5-trimethyl-1-oxa-5-sila-cyclohexan-2-one polymer according to claim 1.

* * * * *